(12) United States Patent
Feyereisen et al.

(10) Patent No.: US 11,307,051 B2
(45) Date of Patent: Apr. 19, 2022

(54) DYNAMIC VERTICAL SITUATION DISPLAY

(71) Applicant: HONEYWELL INTERNATIONAL INC., Morris Plains, NJ (US)

(72) Inventors: Thea Feyereisen, Hudson, WI (US); Rakshit Ramakrishna, Bangalore (IN); Gang He, Morris Plains, NJ (US); Pramod Kumar Malviya, Bangalore (IN); Rui Wang, Morris Plains, NJ (US)

(73) Assignee: HONEYWELL INTERNATIONAL INC., Charlotte, NC (US)

( * ) Notice: Subject to any disclaimer, the term of this patent is extended or adjusted under 35 U.S.C. 154(b) by 416 days.

(21) Appl. No.: 16/426,764

(22) Filed: May 30, 2019

(65) Prior Publication Data

US 2020/0378790 A1 Dec. 3, 2020

(30) Foreign Application Priority Data

Oct. 31, 2018 (IN) .............................. 201841041165

(51) Int. Cl.
*G01C 23/00* (2006.01)
*G05D 1/00* (2006.01)
*G08G 5/00* (2006.01)
*G01D 7/00* (2006.01)

(52) U.S. Cl.
CPC ............ *G01C 23/005* (2013.01); *G01D 7/002* (2013.01); *G08G 5/0021* (2013.01)

(58) Field of Classification Search
CPC ...... G01C 23/005; G01C 23/00; G01D 7/002; G01D 7/00; G08G 5/0021; G08G 5/0052; G08G 5/0065; G08G 5/025; G08G 5/065; G08G 5/00; G05D 1/00
See application file for complete search history.

(56) References Cited

U.S. PATENT DOCUMENTS

| 4,413,322 | A | * | 11/1983 | Foster | .................... G01S 5/02 |
| | | | | | 701/467 |
| 7,321,318 | B2 | | 1/2008 | Crane et al. | |
| 8,099,201 | B1 | * | 1/2012 | Barber | .................. G01C 23/00 |
| | | | | | 701/4 |

(Continued)

FOREIGN PATENT DOCUMENTS

WO 2005057133 A1 6/2005

OTHER PUBLICATIONS

Prevot, Thomas, et al., "Staying Ahead of the Automation: A Vertical Situation Display Can Help," Oct. 2000, 2000-01-5614.

*Primary Examiner* — Yonel Beaulieu
(74) *Attorney, Agent, or Firm* — Lorenz & Kopf, LLP (57) ABSTRACT

A system and method for operating a dynamic vertical situation display on an aircraft includes generating display data for a dynamic vertical situation display displayed on a display based upon flight plan data from a flight management system, where the flight plan data includes a plurality of waypoints and one or more phases of flight. A current phase of flight of the aircraft and a number of waypoints currenting displayed on the dynamic vertical situation display on the display is determined, and instructions to dynamically change a size of the dynamic vertical situation display on the display are generated based upon at least one of the number of waypoints currenting displayed on the display and the current phase of flight of the aircraft.

20 Claims, 10 Drawing Sheets

(56) References Cited

U.S. PATENT DOCUMENTS

| | | | |
|---|---|---|---|
| 8,694,184 B1* | 4/2014 | Boorman | B64C 19/00 |
| | | | 701/14 |
| 9,534,922 B1* | 1/2017 | McCusker | G01C 23/00 |
| 9,583,010 B1* | 2/2017 | Kolek | G08G 5/0065 |
| 10,584,979 B1* | 3/2020 | Gunn | G01C 23/00 |
| 2017/0315706 A1 | 11/2017 | Helppi et al. | |
| 2017/0358219 A1* | 12/2017 | Garai | G08G 5/0047 |
| 2018/0233056 A1* | 8/2018 | Liberman | G01C 23/00 |
| 2018/0268721 A1 | 9/2018 | McCullough et al. | |
| 2018/0273200 A1* | 9/2018 | De Villele | G08G 5/0091 |
| 2019/0019419 A1* | 1/2019 | Gannon | G09B 5/02 |
| 2020/0103924 A1* | 4/2020 | Kushwaha | G05D 1/042 |
| 2021/0375099 A1* | 12/2021 | Huke | G06Q 40/02 |

* cited by examiner

DYNAMIC VERTICAL SITUATION DISPLAY

CLAIM OF PRIORITY

The present application claims benefit of prior filed Indian Provisional Patent Application 201841041165, filed Oct. 31, 2018, which is hereby incorporated by reference herein in its entirety.

TECHNICAL FIELD

The present disclosure generally relates to an aircraft, and more particularly relates to systems and methods for an aircraft display system.

BACKGROUND

Vertical situation displays (VSDs) depict a vertical profile of flight path data for a flight plan of an aircraft. Typical features of a VSD include a swath of terrain that follows either the current flight plan or track of the aircraft. In addition, altitude reference scale and horizontal distance scales are also typically included.

BRIEF SUMMARY

This summary is provided to describe select concepts in a simplified form that are further described in the Detailed Description. This summary is not intended to identify key or essential features of the claimed subject matter, nor is it intended to be used as an aid in determining the scope of the claimed subject matter.

In one embodiment, an aircraft includes a flight management system and a dynamic vertical situation display. The flight management system is configured to monitor a flight plan for the aircraft, where the flight plan include a plurality of waypoints corresponding to one or more phases of flight. The dynamic vertical situation display is in operable communication with the flight management system and includes a display and a processor. The display is configured to display a vertical situation display on at least a portion of the display based upon the flight plan of the aircraft. The processor is communicatively coupled to the display and is configured to determine a current phase of flight of the aircraft and a vertical span of a number of the plurality of waypoints currenting displayed on the vertical situation display on the display. The processor is further configured to generate instructions to dynamically change a size of the vertical situation display on the display based upon at least the vertical span of one of the number of waypoints currenting displayed on the display and the current phase of flight of the aircraft.

In another embodiment, a method for operating a dynamic vertical situation display on an aircraft includes generating, by a processor, display data for a dynamic vertical situation display displayed on a display based upon flight plan data from a flight management system, where the flight plan data includes a plurality of waypoints and one or more phases of flight. A current phase of flight of the aircraft and a number of waypoints currenting displayed on the dynamic vertical situation display on the display is determined by the processor, which generates instructions to dynamically change a size of the dynamic vertical situation display on the display based upon at least one of the number of waypoints currenting displayed on the display and the current phase of flight of the aircraft.

Furthermore, other desirable features and characteristics of the dynamic vertical situation display system and method will become apparent from the subsequent detailed description and the appended claims, taken in conjunction with the accompanying drawings and the preceding background.

BRIEF DESCRIPTION OF THE DRAWINGS

The detailed description will hereinafter be described in conjunction with the following drawing figures, wherein like numerals denote like elements, and wherein.

DETAILED DESCRIPTION

The following detailed description is merely exemplary in nature and is not intended to limit the invention or the application and uses of the invention. As used herein, the word "exemplary" means "serving as an example, instance, or illustration." Thus, any embodiment described herein as "exemplary" is not necessarily to be construed as preferred or advantageous over other embodiments. All of the embodiments described herein are exemplary embodiments provided to enable persons skilled in the art to make or use the invention and not to limit the scope of the invention which is defined by the claims. Furthermore, there is no intention to be bound by any expressed or implied theory presented in the preceding technical field, background, brief summary, or the following detailed description.

In accordance with an embodiment, a dynamic vertical situation display is provided. The dynamic vertical situation display provides an improved experience by automatically altering the size and aspect ratio of the vertical situation display, by giving a user manual control of certain features of the vertical situation display, and by allowing a user to set up custom preferences for how the vertical situation display is displayed, as discussed in further detail below. The dynamic vertical situation display improves the usability of the vertical situation display by providing a clearer representation of the vertical profile of the flight path of the aircraft.

Figure 1:
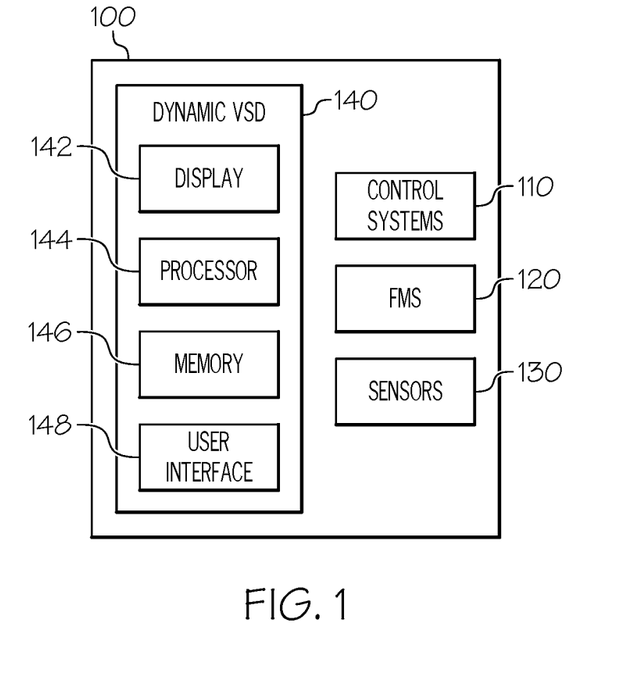
FIG. 1 is a block diagram of an aircraft, in accordance with an embodiment.

FIG. 1 is a block diagram of an aircraft 100, in accordance with an embodiment. The aircraft 100 may be an airplane, a helicopter, a spacecraft, a drone, or the like, or any combination thereof. The aircraft 100 includes multiple controls systems 110 for controlling the movement of the aircraft 100. The controls systems 110 will vary depending upon the type of aircraft 100, but may include, for example, one or more engines, rudders, wings, vertical stabilizers, flaps, landing gear, propellers, and the like.

The aircraft 100 further includes a flight management system (FMS) 120. The flight management system 120 manages a flight plan of the aircraft and may use sensors 130 to guide the aircraft along the flight plan utilizing one or more of the control systems 110. The sensors 130 may include, for example, a global positioning system (GPS) sensor, an altitude sensor, a wind speed sensor, a wind direction sensor, or the like.

The aircraft further includes a dynamic vertical situation display (VSD) 140. The dynamic VSD 140 displays a vertical flight plan of the aircraft 100, as discussed in further detail below. The dynamic VSD 140 includes a display 142. The display 142 may be a liquid crystal display (LCD), a light emitting diode (LED) display, an organic light emitting diode (OLED), a cathode ray tube (CRT) display, or the like. The display 142 may be shared by one or more other systems in the aircraft 100. For example, the display 142 may display both the dynamic VSD 140 and a lateral situation display. Typically, the space within the display 142 would be fixed for each system sharing the display. However, the dynamic VSD 140 can change its size and shape to adapt to the flight plan of the aircraft 100, as discussed in further detail below.

The dynamic VSD 140 further includes a processor 144 and a memory 146. The processor 144 may be, for example, a central processing unit (CPU), a physics processing unit (PPU), a graphics processing unit (GPU), a field programmable gate array (FPGA), an application specific integrated circuit (ASIC), a microcontroller, or any other logic unit or combination thereof. The memory 146 may be any combination of volatile and non-volatile memory. The memory 146 may store non-transitory computer-readable instructions for implementing the dynamic VSD 140, as discussed in further detail below. The processor 144 and a memory 146 may be dedicated to the dynamic VSD 140 or may be shared by one or more other systems in the aircraft 100.

The dynamic VSD 140 further includes a user interface 148. The user interface 148 may include one or more of a touch screen, a mouse, a trackpad, a trackball, a scroll wheel, a microphone, an eye tracker, or the like, or any combination thereof. A user, such as the pilot, may optionally input commands to the dynamic VSD 140 through the user interface 148 to alter a size of the dynamic VSD 140, as discussed in further detail below.

Figure 2:
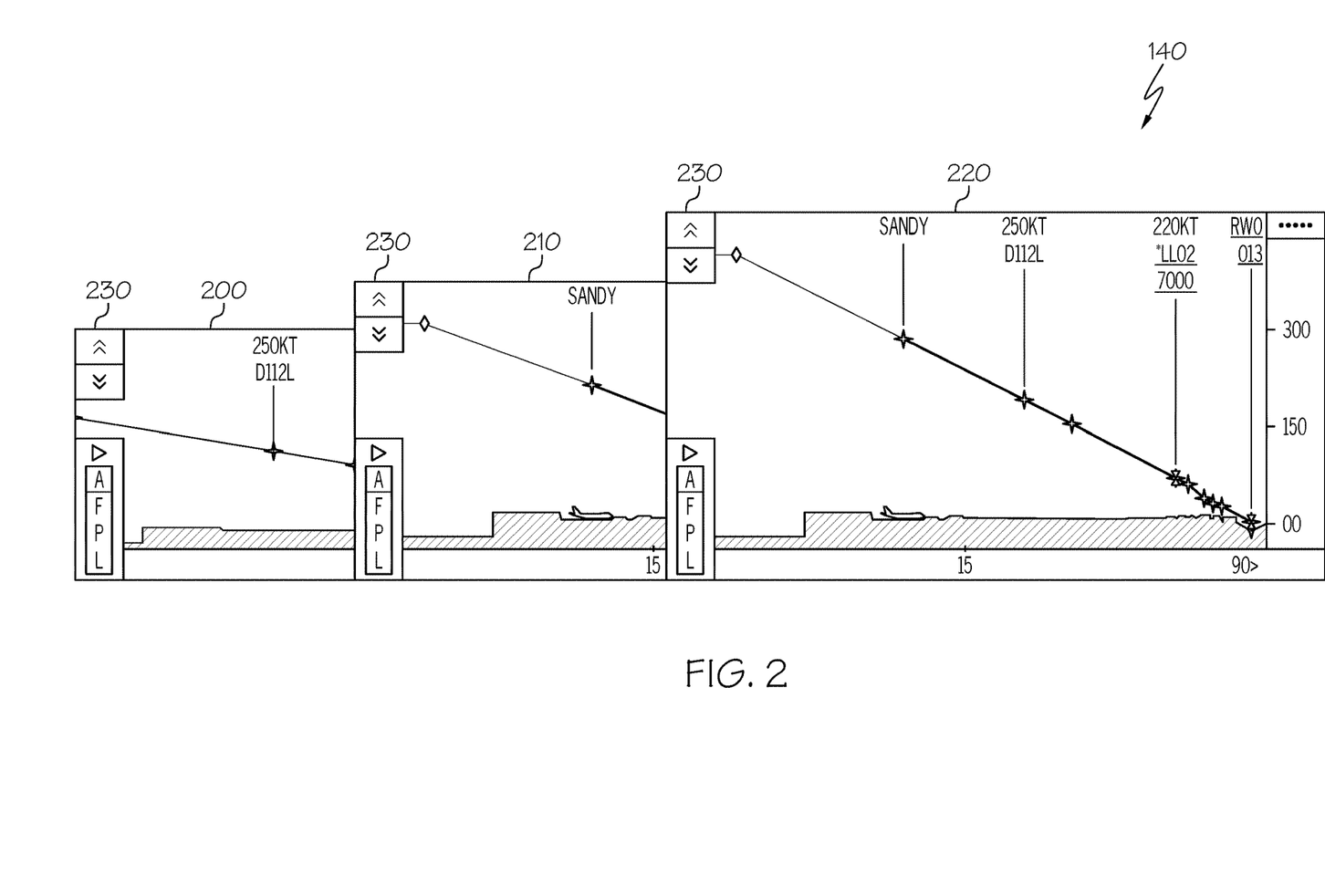
FIG. 2 illustrates an exemplary dynamic VSD, in accordance with an embodiment.

FIG. 2 illustrates an exemplary dynamic VSD 140, in accordance with an embodiment. In the embodiment illustrated in FIG. 2, the dynamic VSD 140 is shown as being three different sizes, a standard size 200, which may be a default size, a medium size 210 and a large size 220. However, the dynamic VSD 140 may include any number of sizes taking up any available portion of the display 142. As discussed in further detail below, the size of the dynamic VSD 140 may be changed automatically by the processor 144, may be changed manually by a user, or any combination thereof. Multiple size options enable the dynamic VSD 140 to automatically, or a pilot to manually, customize the VSD size to best support VNAV visualization. In other words, the size of the dynamic VSD 140 within the display 142 may change so that the user can get a better appreciation of the vertical profile of the flight plan for the aircraft 100.

In one embodiment, for example, a VSD resize interface 230 is displayed, given the user the option to manually change the size of the dynamic VSD 140 within the display 142. The VSD resize interface 230 is illustrated as being in a top left corner of the dynamic VSD 140. However, the VSD resize interface 230 may be located anywhere on the dynamic VSD 140. In one embodiment, for example, the VSD resize interface 230 may include two interfaces, one corresponding to an instruction to increase the size of the dynamic VSD 140 and a second to decrease the size of the dynamic VSD 140. In the exemplary embodiment illustrated in FIG. 2, the VSD resize interface 230 includes an up-arrow interface and a down-arrow interface. However, the VSD resize interface 230 could come in any form using any symbology. For example, when a fixed number of sized VSDs are available, the VSD resize interface 230 could include a separate interface for each size, thereby allowing the user to directly select the desired size for the dynamic VSD 140 without having to scroll through any intermediate sizes. In one embodiment, for example, the resize interface 230 may become available and visible when a cursor, touch or the like from the user interface 148 passes over a hot region on a predefined portion of the dynamic VSD 140, such as the top left corner region seen in FIG. 2.

In one embodiment, for example, the transition of the dynamic VSD 140 from one size to another or for an on/off transition may be animated by the processor 144. The animation may bring attention to the dynamic VSD 140 when the size of the dynamic VSD 140 is altered automatically by the processor 144. The animations, and variables associated therewith such as animation time may be customizable based upon the preferences of the user.

Figure 3:
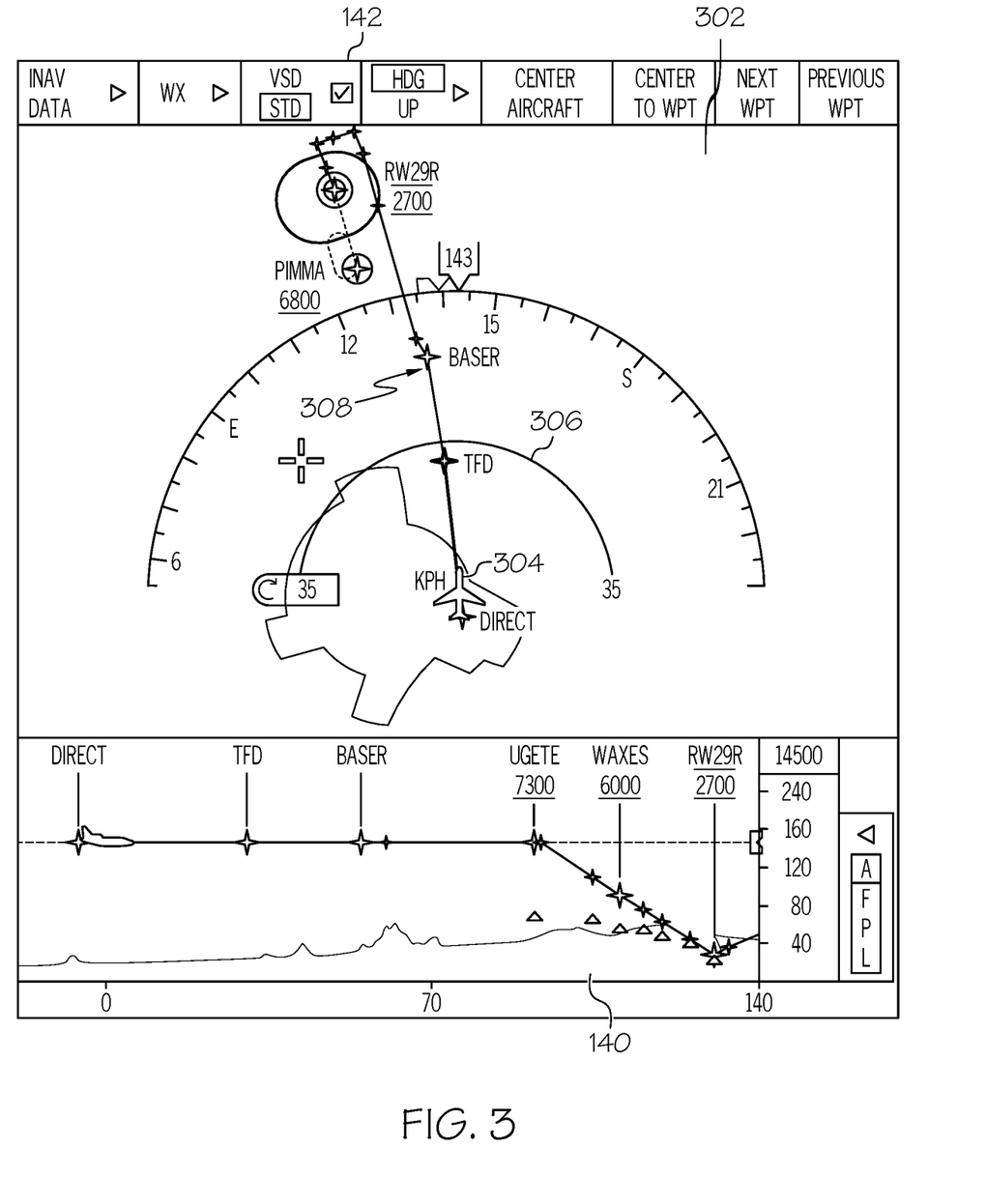
FIGS. 3 and 4 illustrate the simultaneous rendering of a lateral situation display and a dynamic vertical situation display, when the dynamic vertical situation display size is adjusted from a first size (FIG. 3) to an enlarged second size (FIG. 4)
Figure 4:
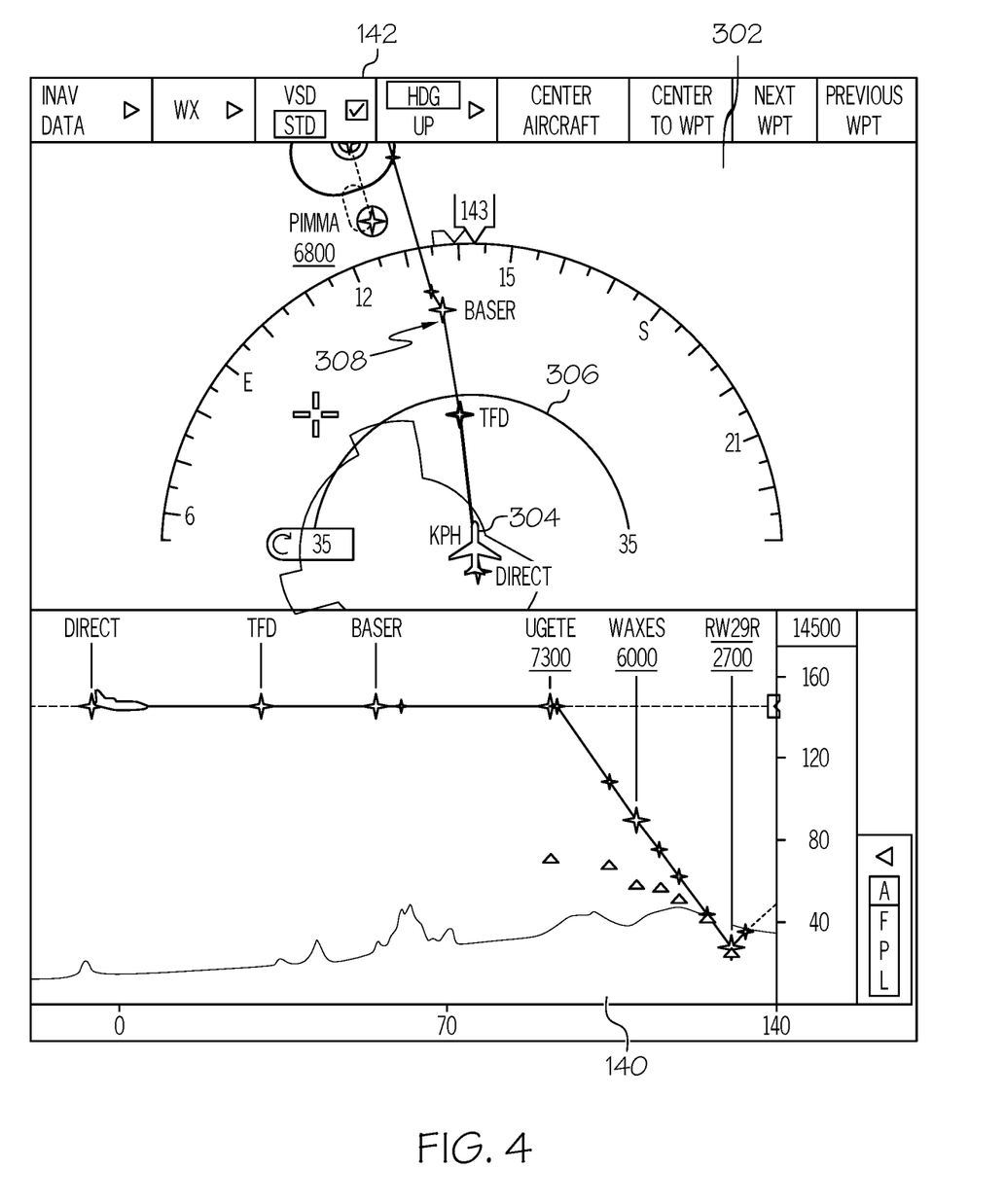

Other display systems sharing the display 142 may be modified depending upon the size of the dynamic VSD 140. For example, as depicted in FIGS. 3 and 4, when a lateral situation display 302 shares the display 142, a map center and the other symbology of the map of the lateral situation display 302, such as a top-view aircraft symbol 304, a range ring 306, and the flight plan 308, are adjusted by the processor 144 (or another processor on the aircraft 100) to provide the additional display area for the dynamic VSD 140 without covering important details for the other system(s) sharing the display. In particular, when the dynamic VSD 140 size is adjusted, either manually or automatically, from a first size (FIG. 3) to an enlarged second size (FIG. 4), the display geometry within the lateral situation display 302 is also adjusted so that the relatively important details, such as the aircraft, range ring, flight plans, etc are within the display window.

In one embodiment, for example, the processor 144 may automatically dynamically resize the dynamic VSD 140 based upon a number of waypoints currently on the display 142, a phase of flight, user preferences, or any combination thereof. For example, when there are more waypoints than a first predetermined number, the processor 144 may expand the dynamic VSD 140 to a first enlarged size, such as the medium size 210 illustrated in FIG. 2 and when there are more waypoints than a second predetermined number, the processor 144 may expand the dynamic VSD 140 to a second enlarged size, such as the large size 220 illustrated in FIG. 2. The first predetermined number and second predetermined number may be based upon user preferences. In other words, the dynamic VSD 140 may be resized depending upon the preferences of the pilot operating the aircraft 100 relative to the number of waypoints on the dynamic VSD 140. Furthermore, the size that the dynamic VSD 140 is changed to may be based upon user preferences. In other words, a user can select preferences relative to the size of the dynamic VSD 140 in relation to the number of waypoints on the dynamic VSD 140. While the above example includes two stages, there can be any number of triggers (i.e., predetermined numbers) and any number of sizes that the dynamic VSD 140 that can be expanded to. In an alternative embodiment, or in combination therewith, the processor 144 may also adjust the size of the dynamic VSD 140 relative to the current phase of flight of the aircraft 100. For example, the processor 144 may automatically expand the dynamic VSD 140 during a takeoff phase and a landing phase and shrink the dynamic VSD 140 during a cruise phase when there is less changes to the vertical profile of the flight plan for the aircraft 100. The size of the dynamic VSD 140 relative to the phase of flight can also be customized by the user such that the dynamic VSD 140 expands and contracts according to the user's preferences relative to the phase of flight. The current phase of flight of the aircraft 100 and the number of waypoints may be determined based upon data from the FMS 120.

Figure 5:
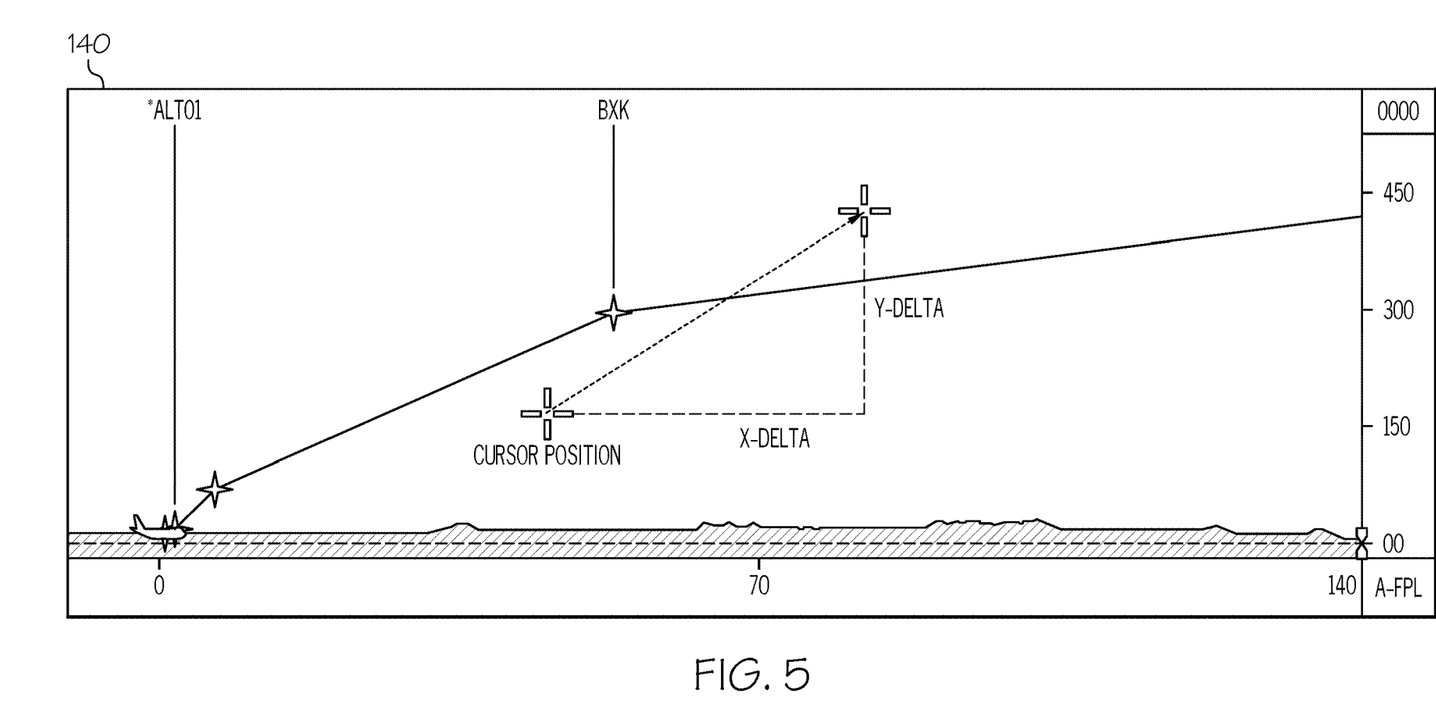
FIG. 5 illustrates an example of a zooming feature, in accordance with an embodiment.
Figure 6:
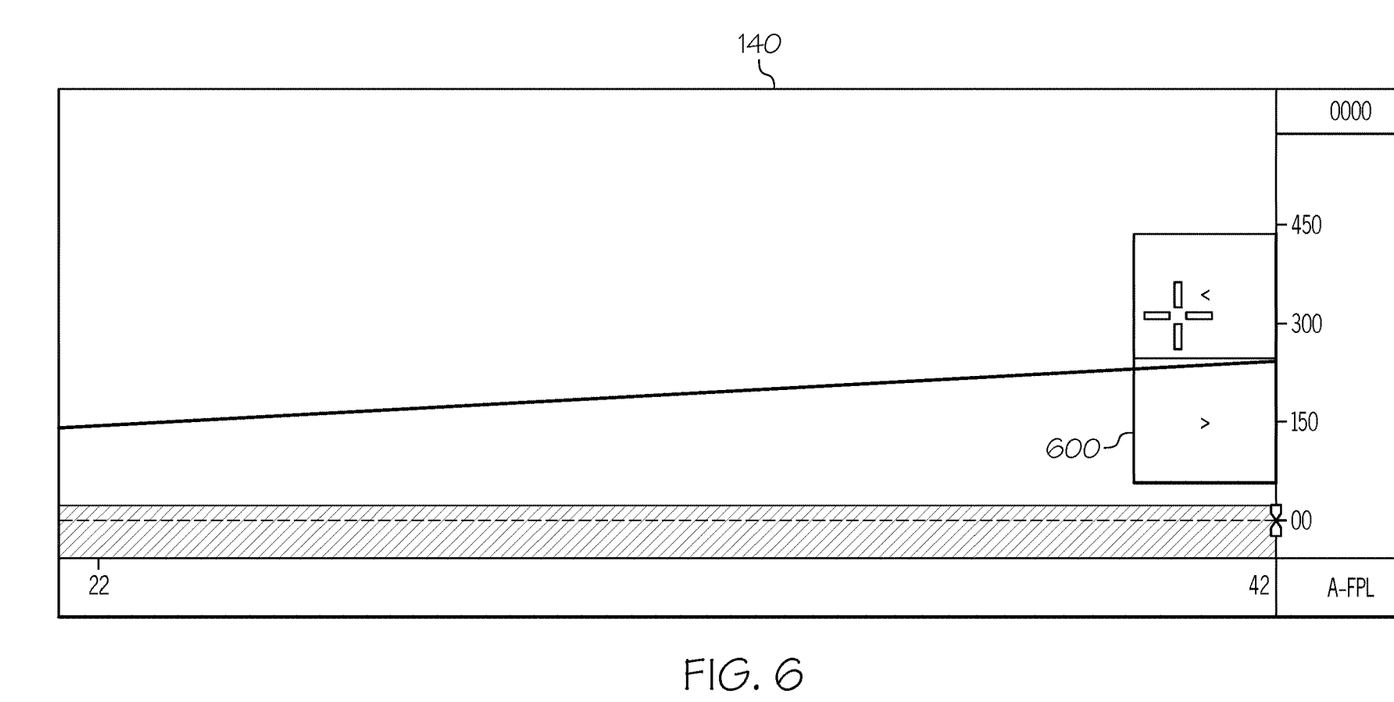
FIG. 6 illustrates another interface within the dynamic VSD which may be used to laterally pan the flight plan on the dynamic VSD.
Figure 7:
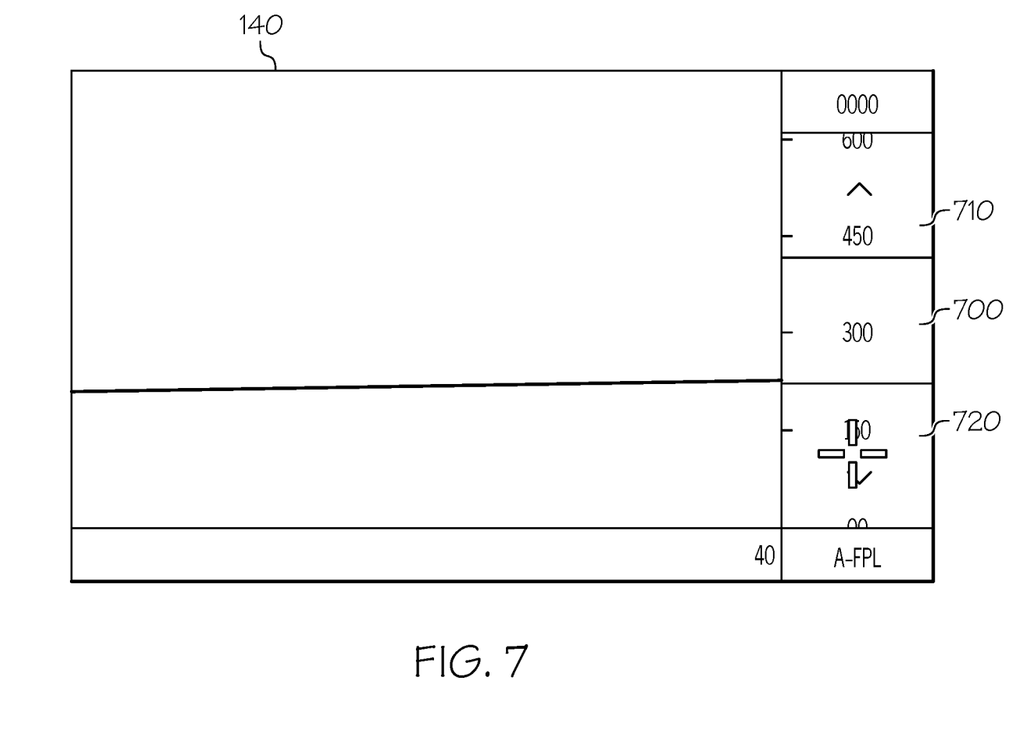
FIG. 7 illustrates an interface within the dynamic VSD which may be used to vertically pan or zoom the flight plan on the dynamic VSD, in accordance with an embodiment.

In one embodiment, for example, the dynamic VSD 140 may be panned, slewed and/or zoomed by a user. FIGS. 5-7 illustrate different interfaces for panning or slewing the dynamic VSD 140 in either a vertical or horizontal direction. The interfaces allows the pilot to pan forward easily along the flight plan or along aircraft track, as well as provide an easier vertical weather inspection tool. Parking logic for horizontal and vertical panning is implemented to avoid displaying large areas of blank space. The upper altitude where the max panning can be done is up to Max Flight Plan altitude or MAX Weather flight level whichever is greater. Horizontal panning in flight plan mode may be restricted to the flight plan max distance.

FIG. 5 illustrates an example of a zooming feature, in accordance with an embodiment. As seen in FIG. 5, a user may select, using the user interface 148, a portion of the vertical profile of the flight plan in which to zoom in. FIG. 6 is an exemplary dynamic VSD 140 which has been zoomed in accordance with the zooming instruction illustrated in FIG. 5. The zooming in/out of a selected section can be performed, for example, by an additional pressing a button of the user interface 148 when a cursor is within the selected areas, as in FIG. 5. Alternatively, a scroll wheel of the user interface 148 can trigger the zooming action to fit the highlighted section when the cursor is within the section. In a touch display option, such an action can be triggered by single or multiple touch actions on the screen. The zooming feature allows the dynamic VSD 140 to zoom out all the way to a maximum altitude range (for example, 65000 ft.) or zoom in up to the four scales down from the default view on that range and flight plan altitudes. In one embodiment, for example, the scale may be 1/100th of the existing altitude range. However, the zoom range, both in or out, may vary depending upon the needs of the system.

Returning to FIG. 5, vertical Z-Scrolling is enabled when a cursor or other user interface 148 in the display 142 of the dynamic VSD 140 is moved while pressing the button in the user interface 148, such as a hat button or the like. In other words, a user can pan through the flight plan on the dynamic VSD 140 by moving a cursor while pressing a predetermined button on the user interface. The Z-Axis discrete on the user interface 148, such as a hat switch, determines when the inputs (X- and Y-Axis inputs) are interpreted for Z-scrolling. In FIG. 5, for example, if the cursor is intended to move from "cursor position" to the position in the upper right, as indicated in FIG. 5, while the hat switch is pressed, the X-Delta and Y-Delta between the positions is calculated using X component and Y component distance changes. X-Delta will be used to pan the dynamic VSD 140 horizontally while Y-Delta is used to pan the dynamic VSD 140 vertically.

FIG. 6 illustrates another interface within the dynamic VSD 140 which may be used to laterally pan the flight plan on the dynamic VSD 140. As seen in FIG. 6, a panning interface 600 may be generated. A user may pan the flight plan laterally (i.e., in the horizontal direction) by interacting with either the left or right arrows of the panning interface. The panning interface 600 may optionally be a hot interface which is only displayed when the user moves a cursor over a predetermined portion of the display 142. However, the panning interface 600 may optionally be a permanent fixture on the dynamic VSD 140. A user may select preferences for how the panning interface 600 is displayed.

FIG. 7 illustrates an interface within the dynamic VSD 140 which may be used to vertically pan or zoom the flight plan on the dynamic VSD 140, in accordance with an embodiment. As seen in FIG. 7, a panning/zooming interface 700 may be generated. In the embodiment illustrated in FIG. 7, the panning/zooming interface 700 is overlaid upon a vertical axis scale of the dynamic VSD 140. A user may click, hover over, or otherwise interact with the upper interface 710 to pan vertically in a first direction and likewise interact with the lower interface 720 to pan in the opposite direction. The panning/zooming interface 700 may also be used to zoom the dynamic VSD 140. A different user interaction (e.g., a right click of a mouse rather than a left click) may be used on the upper and lower interfaces 710 and 720 to zoom within the dynamic VSD 140. The zooming feature changes an aspect ratio of the dynamic VSD 140 allowing the user to control how much of the flight plan is displayed on the dynamic VSD 140. Interacting with the upper interface 710 may zoom-in the display while interacting with the lower interface may zoom-out the display. Any combination of the panning and zooming methods discussed in FIGS. 5-7 may be enabled by the dynamic VSD 140.

Figure 8A:
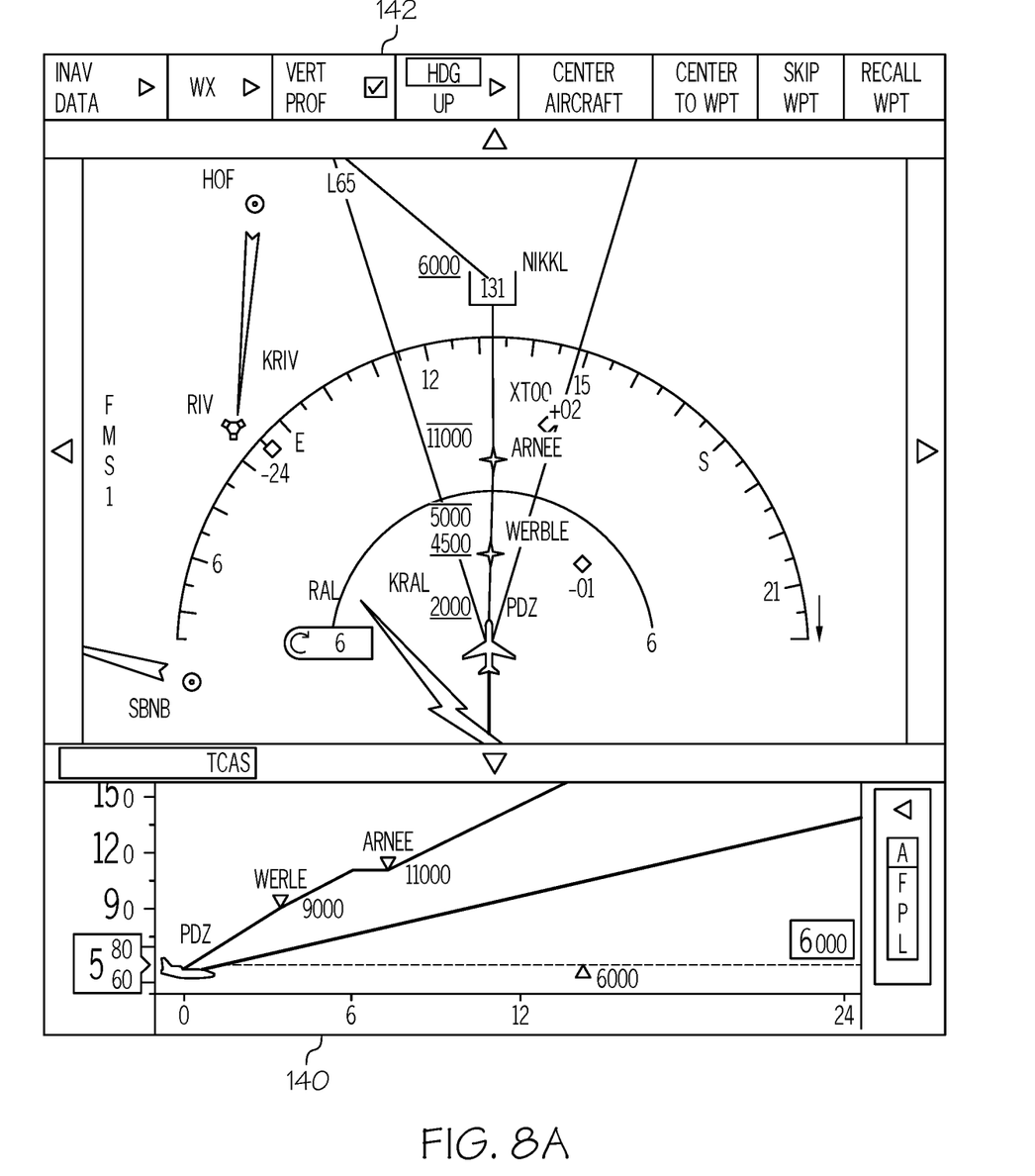
FIGS. 8A and 8B illustrate a comparison between a dynamic VSD without smart aspect ratio and a dynamic VSD which includes smart aspect ratio, in accordance with an embodiment.
Figure 8B:
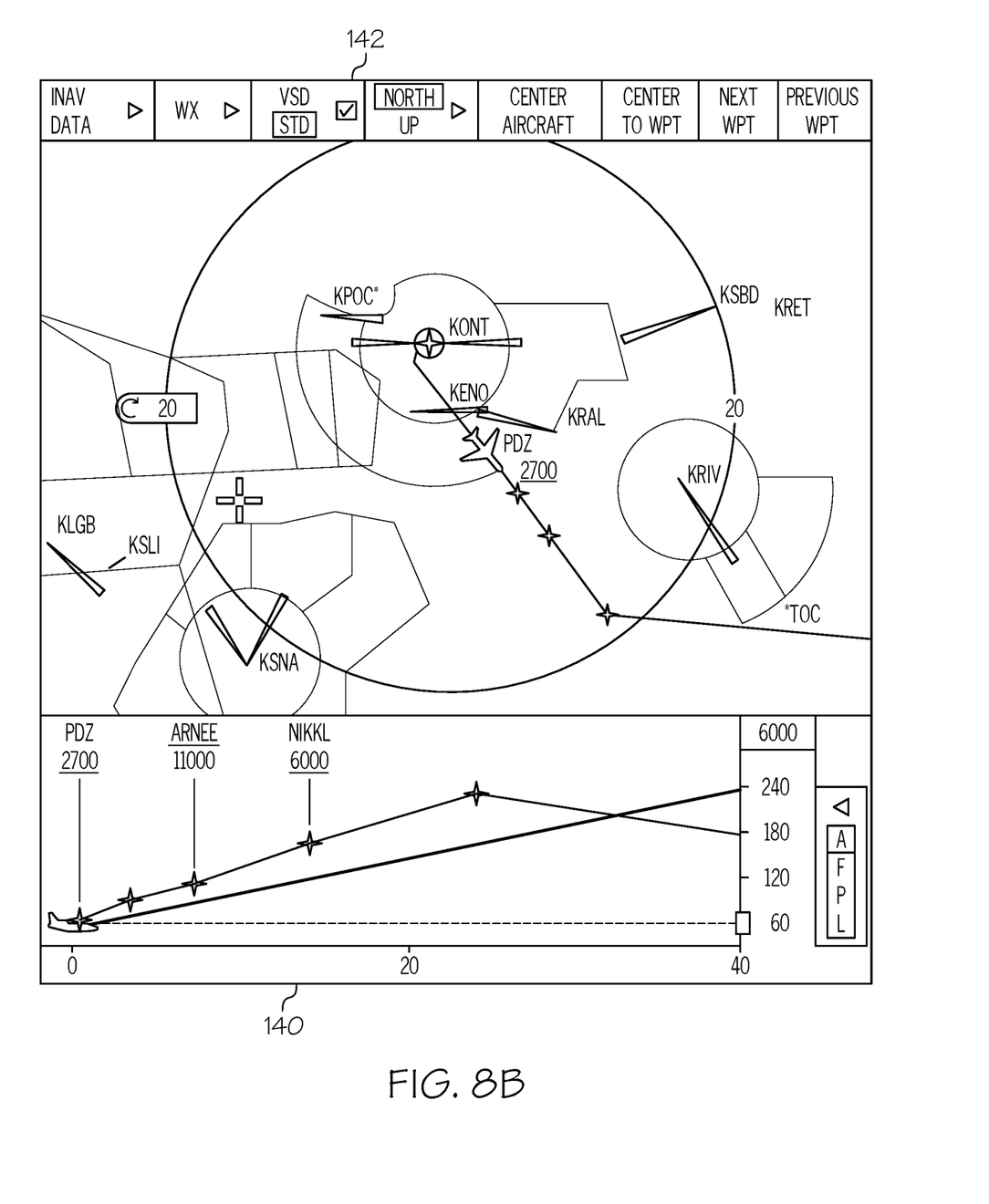

The dynamic VSD 140 may optionally also have a smart aspect ratio, wherein the processor 144 determines an optimal aspect ratio for the display 142. The smart aspect ratio, which is different than smart zooming (which uses a set aspect ratio), considers the highest and lowest altitude per portion of flight plan visible inside the dynamic VSD 140 area and adjust the altitude tape accordingly. FIGS. 8A and 8B illustrates a comparison between a dynamic VSD 140 without smart aspect ratio (FIG. 8A) and a dynamic VSD 140 which includes smart aspect ratio, which is illustrated in FIG. 8B. As seen in FIG. 8A, the flight plan is cut off due to the default aspect ratio. In contrast, as seen in FIG. 8B, the smart aspect ratio of the dynamic VSD 140 automatically adjusts the aspect ratio to show more of the flight plan and give more context to the flight plan for the pilots to view. One example of when the smart aspect ratio is effective is during the approach phase of a flight. During this phase, the flight crew typically requires an enlarged view of the vertical trajectory. As the aircraft is descending, the smart aspect ratio will automatically adjust the vertical side scaling and fit it into the planned profile to maximize vertical display precision with the expanded range.

Figure 9:
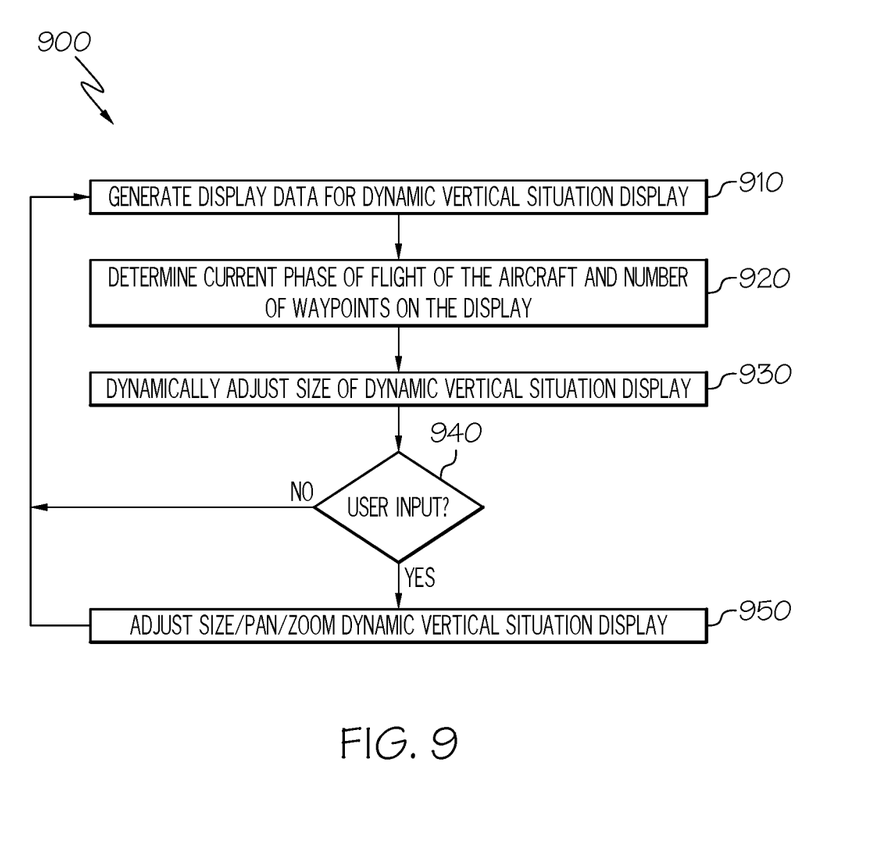
FIG. 9 is a flow diagram illustrating an exemplary method for operating a dynamic vertical situation display, in accordance with an embodiment.

FIG. 9 is a flow diagram illustrating an exemplary method 900 for operating a dynamic vertical situation display, in accordance with an embodiment. The method begins when the processor 144 generates display data for the dynamic vertical situation display. (Step 910). The display data may be based upon the flight plan data from the flight management system 120 and may include the flight plan and one or more waypoints corresponding thereto. The display data may further include one or more of the VSD resize interface 230, the panning interface 400, the panning/zooming interface 500, or any combination thereof.

The processor 144 then determines the number of waypoints currently displayed on the dynamic VSD 140 and/or a current phase of flight of the aircraft 100. (Step 920). The number of waypoints currently displayed on the display may be based upon the flight plan as well as the current horizontal range (e.g., in nautical miles) and vertical range (e.g., altitude range) displayed on the dynamic VSD 140. The processor 144 may then dynamically adjust a size of the dynamic VSD 140 based upon at least one of determined phase of flight, the current number of waypoints displayed in the dynamic VSD 140, user preferences, or any combination thereof. (Step 930). As discussed above, during certain phases of flight, such as take-off and landing phases, a user may prefer having a larger dynamic VSD 140 when there are significant changes to the vertical profile of the flight plan. Likewise, when there are numerous waypoints within a certain distance of each other, and therefor numerous waypoints displayed on the dynamic VSD 140, a user may prefer to have a larger dynamic VSD 140 to more easily recognize and differentiate between the waypoints. The memory 146 may store default settings for the dynamic VSD 140, corresponding to what size the dynamic VSD 140 should be under different conditions as well as user preferences which may modify or supplement the default settings.

The processor 144 may then monitor for user input to any of the interfaces generated by the processor in step 900. (Step 940). If there is no user input, the processor 144 may return to Step 900 to update the dynamic VSD 140, if necessary, as the aircraft travels along the flight plan. If the processor 144 receives user input, the processor may update the dynamic VSD 140, adjusting a size, panning, zooming, or any combination thereof as instructed by the user input. (Step 950). The processor 144 may then return to Step 900 to update the dynamic VSD 140, if necessary, as the aircraft travels along the flight plan.

While at least one exemplary embodiment has been presented in the foregoing detailed description of the invention, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment of the invention. It being understood that various changes may be made in the function and arrangement of elements described in an exemplary embodiment without departing from the scope of the invention as set forth in the appended claims.

What is claimed is:

1. An aircraft, comprising:
    a flight management system configured to monitor a flight plan for the aircraft, the flight plan including a plurality of waypoints corresponding to one or more phases of flight; and
    a dynamic vertical situation display in operable communication with the flight management system, the dynamic vertical situation display comprising:
        a display configured to display a vertical situation display on at least a portion of the display based upon the flight plan of the aircraft;
        a processor communicatively coupled to the display, the processor configured to:
            determine a current phase of flight of the aircraft and a vertical span of a number of the plurality of waypoints currenting displayed on the vertical situation display on the display;
            generate instructions to dynamically change a size of the vertical situation display on the display based upon at least the vertical span of one of the number of waypoints currenting displayed on the display and the current phase of flight of the aircraft.

2. The aircraft according to claim 1, wherein the processor is further configured to enlarge the vertical situation display on the display when the vertical span of number of waypoints currenting displayed on the display is greater than a first predetermined threshold.

3. The aircraft according to claim 2, wherein the processor is further configured to shrink the vertical situation display on the display when the number of waypoints currenting displayed on the display is less than a second predetermined threshold.

4. The aircraft according to claim 1, further comprising a user interface, wherein the processor is further configured to generate instructions for the display for a vertical situation display resize interface, the vertical situation display resize interface enabling manual control of the size of the dynamic vertical situation display based upon input to the vertical situation display resize interface from the user interface.

5. The aircraft according to claim 4, wherein the vertical situation display resize interface corresponds to a hot region on the display, the processor configured to hide the vertical situation display resize interface until receiving user input to the location of the hot region on the display.

6. The aircraft according to claim 1, further comprising a user interface, wherein the processor is further configured to generate instructions for the display for a horizontal panning interface, the horizontal panning interface enabling manual control to horizontally pan the flight plan on the vertical situation display based upon input to the horizontal panning interface from the user interface.

7. The aircraft according to claim 6, wherein the horizontal panning interface corresponds to a hot region on the display, the processor configured to hide the horizontal panning interface until receiving user input to the location of the hot region on the display.

8. The aircraft according to claim 1, further comprising a user interface, wherein the processor is further configured to generate instructions for the display for a vertical panning interface, the vertical panning interface enabling manual control to vertically pan the flight plan on the vertical situation display based upon input to the vertical panning interface from the user interface.

9. The aircraft according to claim 8, wherein the vertical panning interface is overlaid on an altitude axis of the dynamic vertical situation display.

10. The aircraft according to claim 1, wherein the processor is further configured to:
    determine an optimal aspect ratio for the dynamic vertical situation display, the optimal aspect ratio being based upon a highest and lowest altitude per portion of flight plan visible on the dynamic vertical situation display; and
    generate instructions to display the flight plan on the dynamic vertical situation display using the determined optimal aspect ratio.

11. A method for operating a dynamic vertical situation display on an aircraft, comprising:
    generating, by a processor, display data for a dynamic vertical situation display displayed on a display based upon flight plan data from a flight management system, the flight plan data including a plurality of waypoints and one or more phases of flight;

determining, by the processor, a current phase of flight of the aircraft and a number of waypoints currenting displayed on the dynamic vertical situation display on the display; and generating, by the processor, instructions to dynamically change a size of the dynamic vertical situation display on the display based upon at least one of the number of waypoints currenting displayed on the display and the current phase of flight of the aircraft.

12. The method of claim 11, further comprising the vertical situation display on the display when the number of waypoints currenting displayed on the display is greater than a first predetermined threshold.

13. The method of claim 12, further comprising shrinking the vertical situation display on the display when the number of waypoints currenting displayed on the display is less than a second predetermined threshold.

14. The method of claim 11, further comprising generating instructions, by the processor, for a vertical situation display resize interface, the vertical situation display resize interface enabling manual control of the size of the dynamic vertical situation display based upon input to the vertical situation display resize interface from a user interface.

15. The method of claim 14, wherein the vertical situation display resize interface corresponds to a hot region on the display, the processor configured to hide the vertical situation display resize interface until receiving user input to the location of the hot region on the display.

16. The method of claim 11, further comprising generating instructions, by the processor, for a horizontal panning interface, the horizontal panning interface enabling manual control to horizontally pan the flight plan on the vertical situation display based upon input to the horizontal panning interface from a user interface.

17. The method of claim 16, wherein the horizontal panning interface corresponds to a hot region on the display, the processor configured to hide the horizontal panning interface until receiving user input to the location of the hot region on the display.

18. The method of claim 11, further comprising generating instructions, by the processor, for a vertical panning interface, the vertical panning interface enabling manual control to vertically pan the flight plan on the vertical situation display based upon input to the vertical panning interface from a user interface.

19. The method of claim 18, wherein the vertical panning interface is overlaid on an altitude axis of the dynamic vertical situation display.

20. The method of claim 11, further comprising determining, by the processor, an optimal aspect ratio for the dynamic vertical situation display, the optimal aspect ratio being based upon a highest and lowest altitude per portion of flight plan visible on the dynamic vertical situation display; and generating instructions, by the processor, to display the flight plan on the dynamic vertical situation display using the determined optimal aspect ratio.

* * * * *